United States Patent
Li et al.

(10) Patent No.: US 7,868,973 B2
(45) Date of Patent: Jan. 11, 2011

(54) LIQUID CRYSTAL DISPLAY DEVICE WITH TWO LIQUID CRYSTAL

(75) Inventors: Yuan Li, Shenzhen (CN); Kai Meng, Shenzhen (CN)

(73) Assignees: Innocom Technology (ShenZhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 499 days.

(21) Appl. No.: 11/998,020

(22) Filed: Nov. 27, 2007

(65) Prior Publication Data

US 2008/0123025 A1  May 29, 2008

(30) Foreign Application Priority Data

Nov. 27, 2006  (TW) .............................. 95143796 A

(51) Int. Cl.
  G02F 1/1347 (2006.01)
  G02F 1/1337 (2006.01)
(52) U.S. Cl. ........................................ 349/74; 349/123
(58) Field of Classification Search .............. 349/73–74
  See application file for complete search history.

(56) References Cited

U.S. PATENT DOCUMENTS

| | | |
|---|---|---|
| 4,436,379 A | 3/1984 | Funada et al. |
| 4,813,770 A | 3/1989 | Clerc et al. |
| 5,495,351 A | 2/1996 | Shingaki et al. |
| 6,094,244 A | 7/2000 | Kawata et al. |
| 7,394,506 B2 * | 7/2008 | Cirkel et al. ................... 349/15 |
| 2002/0176041 A1 * | 11/2002 | Hisamitsu et al. ........... 349/115 |

FOREIGN PATENT DOCUMENTS

| | | | |
|---|---|---|---|
| JP | 57-208488 A | | 12/1982 |
| WO | WO2004/006005 | * | 11/2005 |

* cited by examiner

*Primary Examiner*—Dung T. Nguyen
(74) *Attorney, Agent, or Firm*—Wei Te Chung

(57) ABSTRACT

An exemplary LCD device (2) includes a first substrate (21), a second substrate (22), a third substrate (23), a first liquid crystal layer (24), and a second liquid crystal layer (25). The first, second, and third substrates are arranged parallel to one another, and the first substrate is interposed between the second and third substrates. The first liquid crystal layer is interposed between the first substrate and the second substrate. The second liquid crystal layer is interposed between the first substrate and the third substrate. Optical rotations of the liquid crystal molecules of the first liquid crystal layer and the liquid crystal molecules of the second liquid crystal layer are reversed relative to each other, with the liquid crystal molecules of the first and second liquid crystal layers being arranged enantiomorphously at the respective opposite sides of the first substrate.

20 Claims, 4 Drawing Sheets $V_{off}$          $V_{on}$ $V_{off}$          $V_{on}$

LIQUID CRYSTAL DISPLAY DEVICE WITH TWO LIQUID CRYSTAL

FIELD OF THE INVENTION

The present invention relates to liquid crystal display (LCD) devices, and particularly to an LCD device with two liquid crystal (LC) layers.

BACKGROUND

Because LCD devices have the advantages of portability, low power consumption, and low radiation, they have been widely used in various portable information products such as notebooks, personal digital assistants (PDAs), video cameras, and the like. Furthermore, LCD devices are considered by many to have the potential to completely replace cathode ray tube (CRT) monitors and televisions.

A conventional LCD device includes a pair of transparent substrates a transparent electrode and an alignment film provided on an inner surface of each of the transparent substrates, an LC layer sandwiched between the two alignment films, a polarizer arranged at an outside surface of each transparent substrate. Polarization directions of the two polarizers are perpendicular to each other. LC molecules of the liquid crystal layer between the transparent substrates are twisted at angles of 90° or 135°. This kind of LCD device is called a twisted nematic (TN) type LCD device or a super-twisted nematic (STN) type LCD device.

When no voltage is applied between the two transparent electrodes, the LC molecules of the LC layer maintain orientations parallel to the transparent substrates. A polarization of polarized light beams entering the liquid crystal layer is rotated along with the LC molecules, and the light beams can transmit out of the LCD device. The LCD device is thus in an on-state. When an appropriate voltage is applied between the two transparent electrodes, the LC molecules are oriented with long axes thereof being perpendicular to the two transparent substrates. Then light beams entering the liquid crystal layer cannot pass through, and so do not transmit out of the LCD device. The LCD device is thus in an off-state.

A so-called anchoring energy exists between the LC molecules and the adjacent alignment films. Due to the anchoring energy, when the LCD device is in an off-state, LC molecules adjacent to the alignment films cannot be oriented completely perpendicular to the transparent substrates. Thus, part of the incoming light beams leaks out of the LCD device. Accordingly, the LCD device cannot display a completely black picture. This also means the LCD device has a low contrast ratio and a narrow viewing angle.

Accordingly, what is needed is an LCD device that can overcome the above-described deficiencies.

SUMMARY

An exemplary LCD device includes a first substrate, a second substrate, a third substrate, a first liquid crystal layer, and a second liquid crystal layer. The first, second, and third substrates are arranged parallel to one another, and the first substrate is interposed between the second and third substrates. The first liquid crystal layer is interposed between the first substrate and the second substrate. The second liquid crystal layer is interposed between the first substrate and the third substrate. The first and second liquid crystal layers comprise liquid crystal molecules. Optical rotations of the liquid crystal molecules of the first liquid crystal layer and the liquid crystal molecules of the second liquid crystal layer are reversed relative to each other, with the liquid crystal molecules of the first and second liquid crystal layers being arranged enantiomorphously at the respective opposite sides of the first substrate.

Another exemplary LCD device includes a liquid crystal display cell and a liquid crystal compensation cell stacked with the liquid crystal display cell. The liquid crystal display cell includes a first and a second substrates arranged parallel to each other, and a first liquid crystal layer sealed between the first and second substrates. The liquid crystal compensation cell includes a first and a third substrates arranged parallel to each other, and a second liquid crystal layer sealed between the third and fourth substrates. The liquid crystal compensation cell compensates an optical phase difference of the liquid crystal display cell, and optical rotations of liquid crystal molecules of the first and second liquid crystal layers are reversed relative to each other.

Other novel features and advantages will become more apparent from the following detailed description when taken in conjunction with the accompanying drawings. In the drawings, all the views are schematic.

DETAILED DESCRIPTION OF PREFERRED EMBODIMENTS

Reference will now be made to the drawings to describe embodiments of the present invention in detail.

Figure 1:
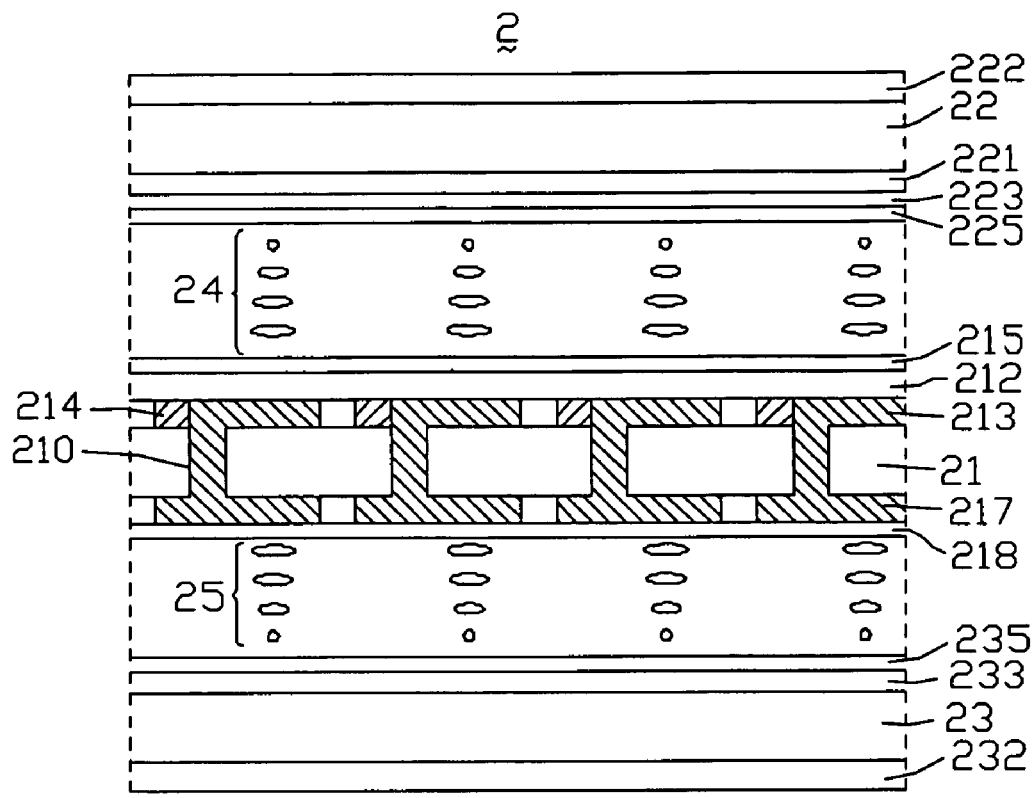
FIG. 1 is a side cross-sectional view of part of an LCD device according to a first embodiment of the present invention.

Referring to FIG. 1, this is a schematic, side cross-sectional view of part of an LCD device 2 according to a first embodiment of the present invention. The LCD device 2 includes a first substrate 21, a second substrate 22, a third substrate 23, a first LC layer 24, and a second LC layer 25. The third substrate 23, the first substrate 21, and the second substrate 22 are arranged in that order from bottom to top. The first LC layer 24 is interposed between the first and second substrates 21, 22. The first substrate 21, the second substrates 22, and the first LC layer 24 cooperatively define a first liquid crystal display cell (not labeled). The second LC layer 25 is interposed between the first and third substrates 21, 23. The first substrate 21, the third substrate 23 and the second LC layer 25 cooperatively define a second liquid crystal display cell (not labeled).

A plurality of thin film transistors (TFTs) 214 and a plurality of first pixel electrodes 213 are alternately arranged on a surface of the first substrate 21 facing toward the first LC layer 24. Each of the TFTs 214 is electrically connected to an adjacent pixel electrode 213. A plurality of second pixel electrodes 217 are arranged on another surface of the first substrate 21 facing toward the second LC layer 25. Each of the second pixel electrodes 217 is opposite to a corresponding first pixel electrode 213. Between each pair of the first and second pixel electrodes 213, 217, a contact hole (via) 210 is formed through the first substrate 21. Each first pixel electrode 213 is electrically connected to the opposite second pixel electrode 217 via a corresponding contact hole 210.

A first polarizer 212 covers the TFTs 214 and the first pixel electrodes 213. A first alignment film 215 is arranged on the first polarizer 212. A second alignment film 218 is arranged on the second pixel electrodes 217.

A color filter 221, a first common electrode 223, and a third alignment film 225 are arranged on an inner surface of the second substrate 22, in that order from top to bottom. A second polarizer 222 is arranged on an outer surface of the second substrate 22.

A second common electrode 233 and a fourth alignment film 235 are arranged on an inner surface of the third substrate 23 in that order form bottom to top. A third polarizer 232 is arranged on an outer surface of the third substrate 23.

The first and second LC layers 24, 25 contain twisted nematic LC molecules with reverse optical rotations. The first LC layer 24 contains left-handed LC molecules, and the second LC layer 25 contains right-handed LC molecules. The LC molecules of the first and second LC layers 24, 25 are arranged enantiomorphously at the respective opposite sides of the first substrate 21.

Each of the first, second, third, and fourth alignment films 215, 218, 225, 235 is a homogeneously aligned alignment film. Alignment directions of the first and second alignment films 215, 218 are parallel to each other. Alignment directions of the first and third alignment films 215, 225 are perpendicular to each other. Alignment directions of the second and fourth alignment films 218, 235 are perpendicular to each other. A polarizing axis of the first polarizer 212 is perpendicular to that of the second polarizer 222. A polarizing axis of the second polarizer 222 is parallel to that of the third polarizer 232.

The first and second pixel electrodes 213, 217 and the first and second common electrodes 223, 233 may be made of transparent conductive material, such as indium-tin-oxide (ITO), indium-zinc-oxide (IZO), and the like.

Each TFT 214, a corresponding first pixel electrode 213, a corresponding portion of the first common electrode 223, and a corresponding portion of the first LC layer 24 therebetween cooperatively define a first pixel region (not labeled). Each second pixel electrode 217, a corresponding portion of the second common electrode 233, and a corresponding portion of the second LC layer 25 therebetween cooperatively define a second pixel region (not labeled). The plurality of first and second pixel regions are symmetrically arranged at the two opposite sides of the first substrate 21. Each of the TFTs 214 functions as a switching element for controlling transmittance of light beams of one of the first and second pixel regions. The color filter is used for displaying color images.

Figure 2:
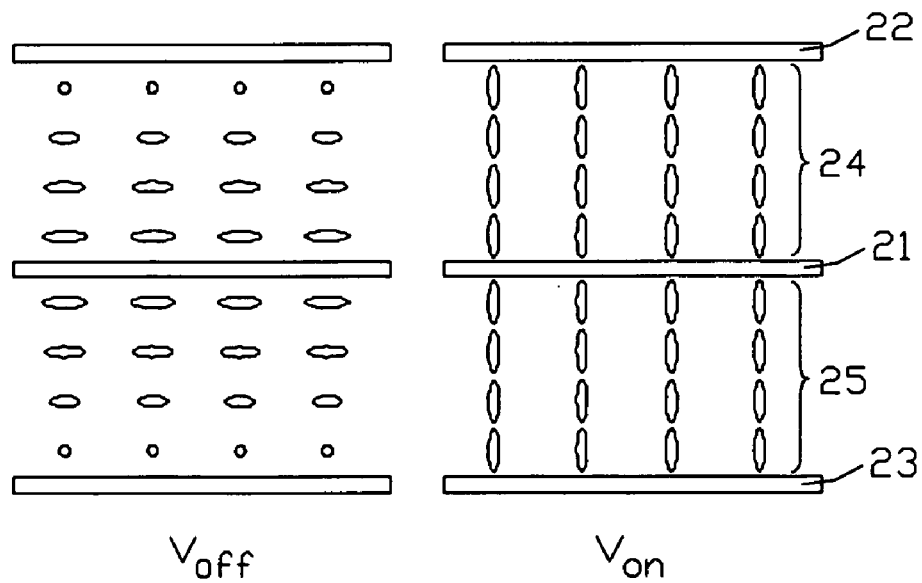
FIG. 2 shows orientations of liquid crystal molecules of the LCD device of FIG. 1, in respect of an on-state (no voltage applied) and an off-state (voltage applied) of the LCD device.
Figure 3:
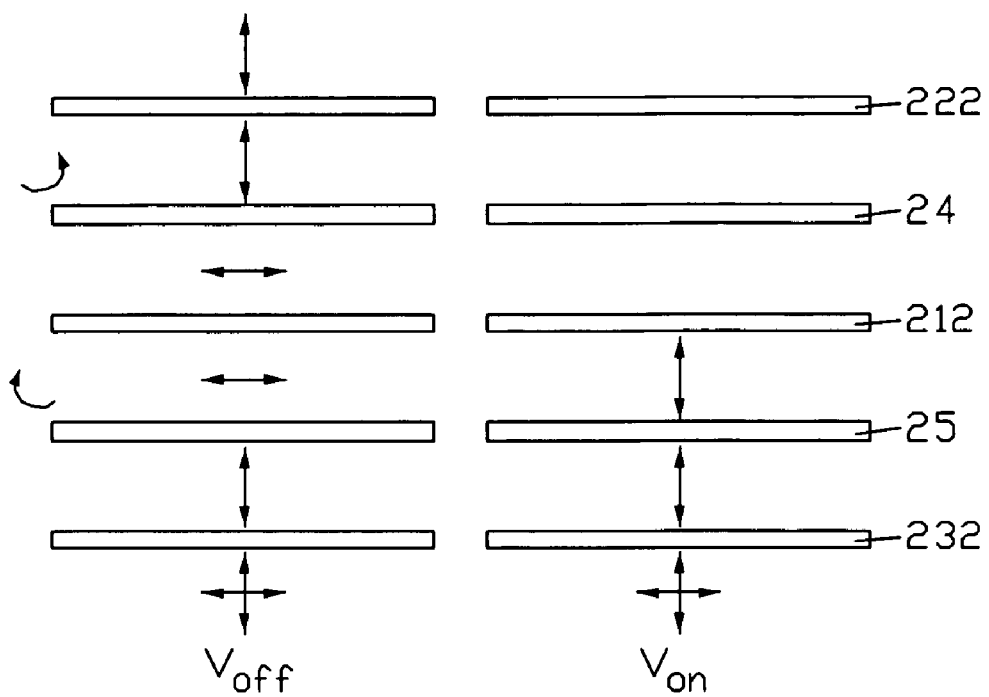
FIG. 3 shows polarized states of light beams in each of certain layers of the LCD device of FIG. 1, in respect of the on-state and the off-state of the LCD device.

Referring also to FIGS. 2-3, these show orientations of LC molecules of the first and second LC layers 24, 25 in respect of an on-state (no voltage applied) and an off-state (voltage applied) of the LCD device 2, polarized states of light beams in each of certain layers of the LCD device 2 in respect of the on-state and the off-state.

When the TFTs 214 are switched off, no voltage is applied to the first and second pixel electrodes 213, 217, and the LC molecules of the first and second LC layers 24, 25 are homogeneously aligned. The LCD device 2 is in an on-state (white state). Ambient incident light beams are converted into linearly-polarized light beams with a polarizing direction parallel to that of the third polarizer 232 after passing through the third polarizer 232. Thereafter, when the light beams pass through the second LC layer 25, the polarizing direction of the light beams twists clockwise by an amount of 90° along with the LC molecules. Thereby, the polarizing direction of the linearly-polarized light beams is parallel to that of the first polarizer 212. Then the linearly-polarized light beams pass through the first polarizer 241 and into the first LC layer 24. When the light beams pass through the first LC layer 24, the polarizing direction of the linearly-polarized light beams twists counterclockwise by an amount of 90°. Thereby the polarizing direction of the linearly-polarized light beams is parallel to that of the second polarizer 222, and the light beams finally are output through the second polarizer 222 for displaying images.

On the other hand, when the TFTs 214 are switched on, a voltage is applied to the first and second pixel electrodes 213, 217, and the LCD device 2 is in an off-state (black state). A first electric field is formed between the first and second substrates 21, 22, and a second electric field is formed between the first and third substrates 21, 23. Directions of the first and second electric fields are reversed relative to each other, but all the directions are perpendicular to the three substrates 21, 22, 23. Driven by the electric fields, the LC molecules of the first and second LC layers 24, 25 are rotated by an amount of 90°. Thus, long axes of the LC molecules become oriented parallel to the directions of the electric fields. Light beams become linearly-polarized light beams having a polarizing direction parallel to that of the first polarizer 232 after passing through the third polarizer 232. Because the transmitting direction of the linearly-polarized light beams is parallel to the long axes of the LC molecules, the polarizing direction of the linearly-polarized light beams is maintained when the light beams pass though the second LC layer 25. Because the polarizing direction of the linearly-polarized light beams is perpendicular to that of the first polarizer 212, the linearly-polarized light beams cannot pass through the first polarizer 212. Then no light beams pass through the LCD 2, and the LCD 2 displays a black image.

With the above-described configurations, the LC molecules of the first and second LC layers 24, 25 have reverse optical rotations, and are arranged enantiomorphously at the respective opposite sides of the first substrate 21. The first LC layer 24 acts as a compensation layer. The first LC layer 24 compensates for any optical phase differences caused by the second LC layer 25 due to the LC molecules of the second liquid crystal layer 25 not being completely perpendicular to the first and third substrates 21, 23. This reduces light leakage when the LCD device 2 is in the off-state, and thereby increases a contrast ratio of the LCD device 2. Moreover, the first LC layer 24 compensates for color-shift of the LCD device 2 according to different viewing angles. Thus a wide viewing angle performance of the LCD device 2 is improved.

In alternative embodiments, the first LC layer 24 may contain right-handed LC molecules, and the second LC layer 25 may contain left-handed LC molecules. The TFTs 214 can be arranged at the surface of the first substrate 21 facing toward the second LC layer 25. The color filter 221 can be arranged at a selected surface of the first or the second substrates 21, 23. In order to achieve better color saturation, more than one color filter 221 may be employed in the LCD device 2.

Figure 4:
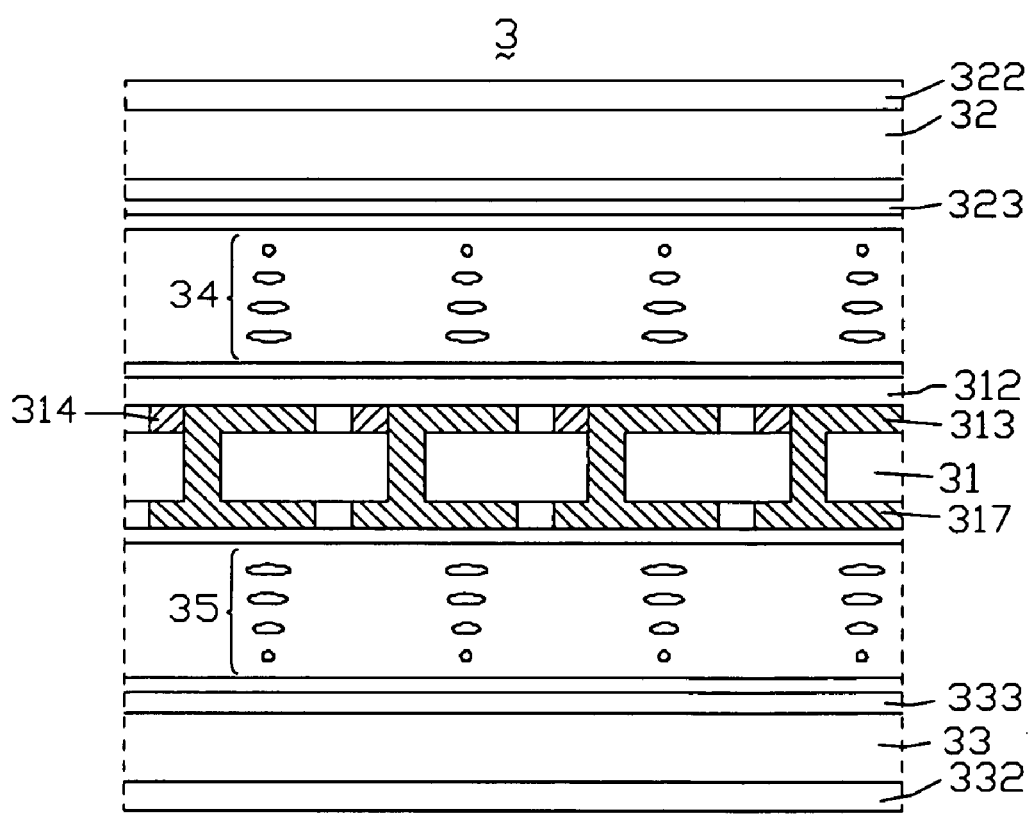
FIG. 4 is a side cross-sectional view of part of an LCD device according to a second embodiment of the present invention.

FIG. 4 is a schematic, side cross-sectional view of part of an LCD device 3 according to a second embodiment of the present invention. The LCD device 3 has a similar structure to that of the LCD device 2. However, polarizing directions of a first, a second, and a third polarizers 312, 322, 332 are parallel to each other. The LCD device 3 also includes a first common electrode 323 and a second common electrode 333.

Figure 5:
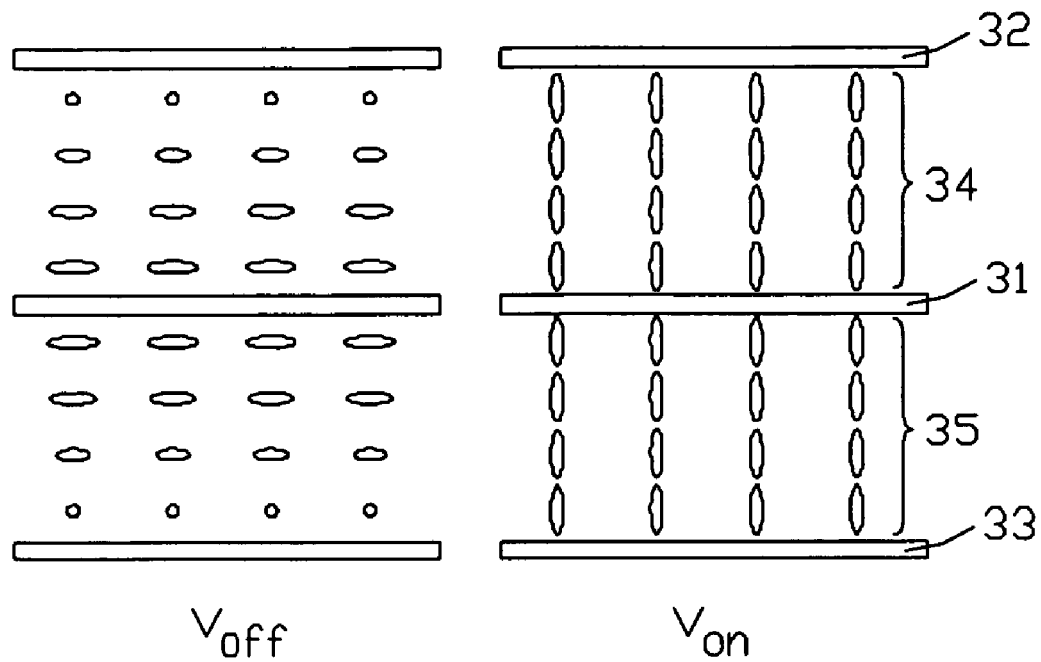
FIG. 5 shows orientations of liquid crystal molecules of the LCD device of FIG. 4, in respect of an off-state (no voltage applied) and an on-state (voltage applied) of the LCD device.
Figure 6:
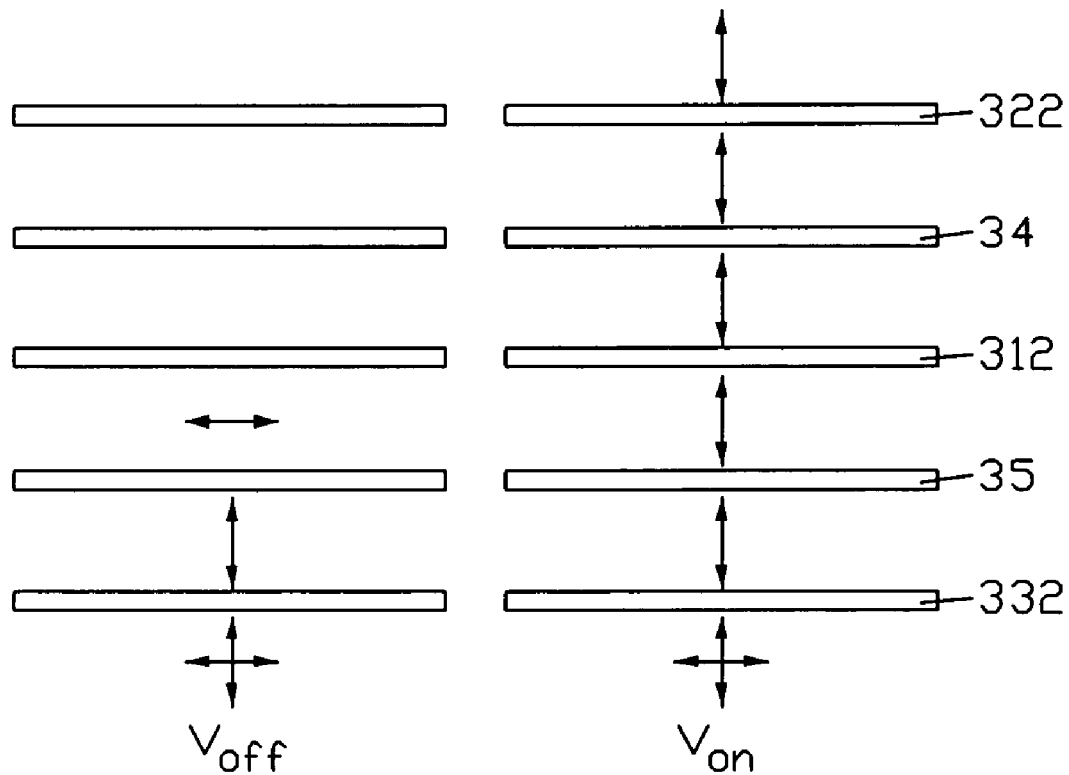
FIG. 6 shows polarized states of light beams in each of certain layers of the LCD device of FIG. 4, in respect of the off-state and the on-state of the LCD device.

FIGS. 5 and 6 show orientations of LC molecules of first and second LC layers 34, 35 in respect of an off-state (no voltage applied) and an on-state (voltage applied) of the LCD device 4, and polarized states of light beams in each of certain layers of the LCD device 3 in respect of the off-state and the on-state.

When the TFTs 314 are switched off, no voltages are applied to the first and second pixel electrodes 313, 317, and LC molecules of the first and second LC layers 34, 35 are homogeneously aligned. The LCD device 3 is in an off-state (black state). Light beams become linearly-polarized light beams having a polarizing direction parallel to that of the third polarizer 332 after passing through the third polarizer 332. Thereafter, when the linearly-polarized light beams pass through the second LC layer 35, the polarizing direction of the light beams is rotated clockwise by an amount of 90° along with the LC molecules. Then the polarizing direction of the linearly-polarized light beams becomes perpendicular to that of the first polarizer 312. The linearly-polarized light beams cannot pass through the first polarizer 312 due to the perpendicular polarizing direction of the first polarizer 312. The LCD 3 displays a black image.

On the other hand, when the TFTs 314 are switched on, voltages are applied to the first and second pixel electrodes 313, 317. A first electric field is formed between the first and second substrates 31, 32, and a second electric field is formed between the first and third substrates 31, 33. The LCD device 3 is in an on-state (white state). Directions of the first and second electric fields are both perpendicular to the first substrate 31. Driven by the first and second electric fields, the LC molecules of the first and second LC layers 34, 35 are rotated by an amount of 90°. That is, long axes of the LC molecules become oriented parallel to the directions of the electric fields. Light beams become linearly-polarized light beams having a polarizing direction parallel to that of the first polarizer 332 after passing through the third polarizer 332. Because the transmitting direction of the light beams is parallel to the long axes of the LC molecules, the polarizing direction of the linearly-polarized light beams is maintained when the light beams pass though the second LC layer 35. Then the light beams can pass through the first polarizer 312. When the light beams pass through the first LC layer 34, the polarizing direction of the linearly-polarized light beams is maintained. Thus, the light beams can also pass through the second polarizer 322 for displaying images.

Figure 7:
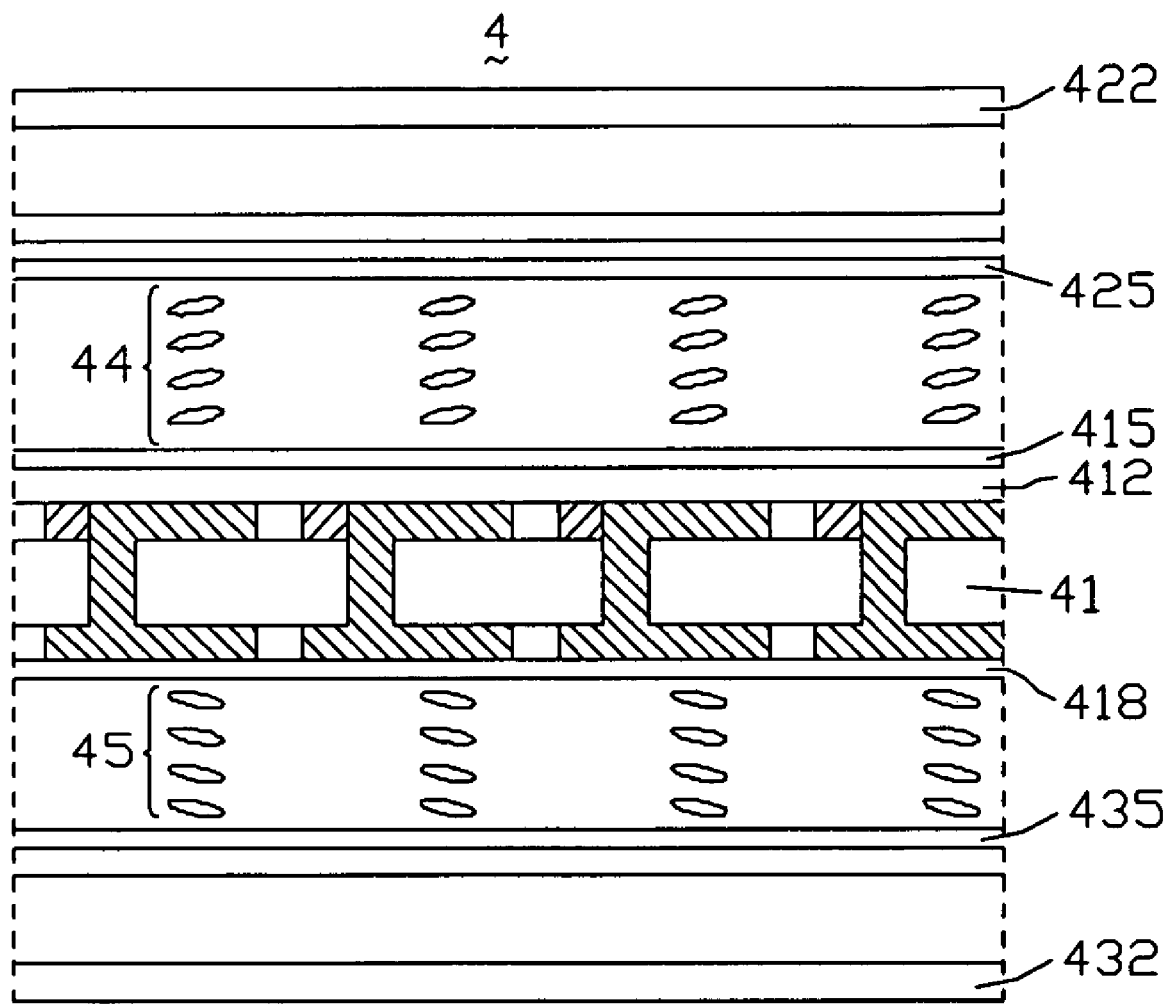
FIG. 7 is a side cross-sectional view of part of an LCD device according to a third embodiment of the present invention.

FIG. 7 is a schematic, side cross-sectional view of part of an LCD device 4 according to a third embodiment of the present invention. The LCD device 4 has a similar structure to that of the LCD device 2. However, LC molecules of a first and a second LC layers 44, 45 are electrically controlled birefringence (ECB) mode LC molecules. When the LCD device 4 is in a passive state (no voltage applied), the LC molecules of the first LC layer 44 all have a same tilted orientation, and the LC molecules of the second LC layer 45 all have a same tilted orientation. The tilted orientation of the LC molecules of the first LC layer 44 is symmetrical relative to the tilted orientation of the LC molecules of the second LC layer 45. Thus the LC molecules of the first and second LC layers 44, 45 are arranged at two sides of a first substrate 41 as mirror images.

A first, a second, a third, and a fourth alignment films 415, 418, 425, 435 are each homogeneously aligned alignment films. Alignment directions of the first, second, third, and fourth alignment films 415, 418, 425, 435 are parallel to each other. The alignment direction of the four alignment films 415, 418, 425, 435 maintains an angle of 45° relative to respective polarizing directions of a first, a second, and a third polarizers 412, 422, 432. Thus, long axes of the LC molecules also maintain an angle of 45° relative to the polarizing directions of the first, second, and third polarizers 412, 422, 432.

It is to be understood, however, that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A liquid crystal display device, comprising:
    a first substrate, a second substrate, and a third substrate arranged parallel to one another, the first substrate being interposed between the second and third substrates;
    a first liquid crystal layer interposed between the first substrate and the second substrate, the first liquid crystal layer comprising liquid crystal molecules;
    a second liquid crystal layer interposed between the first substrate and the third substrate, the second liquid crystal layer comprising liquid crystal molecules;
    a plurality of thin film transistors and a plurality of first pixel electrodes alternatively arranged at a surface of the first substrate, each of the thin film transistors being electrically connected to a corresponding first pixel electrode; and
    a plurality of second pixel electrodes arranged at another surface of the first substrate, each of the second pixel electrodes being opposite to one of the first pixel electrodes;
    wherein between each of the first pixel electrodes and a corresponding second pixel electrode, a contact hole is formed through the first substrate, the first pixel electrode is electrically connected to the corresponding second pixel electrode via the corresponding contact hole, and optical rotations of the liquid crystal molecules of the first liquid crystal layer and the liquid crystal molecules of the second liquid crystal layer are reversed relative to each other, with the liquid crystal molecules of the first and second liquid crystal layers being arranged enantiomorphously at the respective opposite sides of the first substrate.

2. The liquid crystal display device as claimed in claim 1, further comprising a first polarizer arranged at one side of the first substrate, a second polarizer arranged at an outer surface of the second substrate, and a third polarizer arranged at an outer surface of the third substrate.

3. The liquid crystal display device as claimed in claim 2, wherein a polarizing axis of the first polarizer is perpendicular to that of the second polarizer, and the polarizing axis of the second polarizer is parallel to that of the third polarizer.

4. The liquid crystal display device as claimed in claim 2, wherein polarizing axes of the first, second, and third polarizers are parallel to each other.

5. The liquid crystal display device as claimed in claim 2, further comprising a first alignment film arranged between the first substrate and the first liquid crystal layer, a second alignment film arranged between the first substrate and the second liquid crystal layer, a third alignment film arranged between the second substrate and the first liquid crystal layer, and a fourth alignment film arranged between the third substrate and the second liquid crystal layer.

6. The liquid crystal display device as claimed in claim 5, wherein the first, second, third, and fourth alignment films are homogeneously aligned alignment films, respectively.

7. The liquid crystal display device as claimed in claim 6, wherein alignment orientations of the first and second alignment films are parallel to each other, the alignment orientation of the first alignment film is perpendicular to that of the third alignment film, and the alignment orientation of the second alignment film is perpendicular to that of the fourth alignment film.

8. The liquid crystal display device as claimed in claim 6, wherein alignment orientations of the first, second, third, and fourth alignment films are parallel to each other.

9. The liquid crystal display device as claimed in claim 8, wherein long axes of the liquid crystal molecules of the first liquid crystal layer and the second liquid crystal layer maintain an angle of 45° relative to polarizing directions of the first, second and third polarizers.

10. A liquid crystal display device, comprising:
a liquid crystal display cell comprising a first substrate and a second substrate arranged parallel to each other, and a first liquid crystal layer sealed between the first and second substrates; and
a liquid crystal compensation cell comprising the first substrate and a third substrate arranged parallel to each other, and a second liquid crystal layer sealed between the first and third substrates;
wherein the first substrate comprises a plurality of contact holes extending therethrough, a plurality of first pixel electrodes are arranged on a surface of the first substrate adjacent to the first liquid crystal layer, a plurality of second pixel electrodes are arranged on another surface of the first substrate adjacent to the second liquid crystal layer, each of the first pixel electrodes is electrically connected to one corresponding second pixel electrode via one corresponding contact hole, the liquid crystal compensation cell compensates an optical phase difference of the liquid crystal display cell, and optical rotations of liquid crystal molecules of the first and second liquid crystal layers are reversed relative to each other.

11. The liquid crystal display device as claimed in claim 10, wherein the first and second liquid crystal layers are arranged as mirror images.

12. The liquid crystal display device as claimed in claim 11, further comprising a first polarizer arranged at one surface of the first substrate, a second polarizer arranged at an outer surface of the second substrate, and a third polarizer arranged at an outer surface of the third substrate.

13. The liquid crystal display device as claimed in claim 12, wherein a polarizing axis of the first polarizer is perpendicular to that of the second polarizer, and the polarizing axis of the second polarizer is parallel to that of the third polarizer.

14. The liquid crystal display device as claimed in claim 12, wherein polarizing axes of the first, second, and third polarizers are parallel to each other.

15. The liquid crystal display device as claimed in claim 12, further comprising a first alignment film arranged between the first substrate and the first liquid crystal layer, a second alignment film arranged between the first substrate and the second liquid crystal layer, a third alignment film arranged between the second substrate and the first liquid crystal layer, and a fourth alignment film arranged between the third substrate and the second liquid crystal layer.

16. The liquid crystal display device as claimed in claim 15, wherein alignment orientations of the first and second alignment films are parallel to each other, the alignment orientation of the first alignment film is perpendicular to that of the third alignment film, and the alignment orientation of the second alignment film is perpendicular to that of the fourth alignment film.

17. The liquid crystal display device as claimed in claim 15, wherein alignment orientations of the first, second, third, and fourth alignment films are parallel to each other.

18. The liquid crystal display device as claimed in claim 17, wherein long axes of the liquid crystal molecules of the first liquid crystal layer and the second liquid crystal layer maintain an angle of 45° relative to polarizing directions of the first, second and third polarizers.

19. The liquid crystal display device as claimed in claim 10, further comprising a plurality of thin film transistors disposed on the first substrate, each thin film transistor electrically connected to one corresponding first pixel electrode and one corresponding second pixel electrode.

20. The liquid crystal display device as claimed in claim 19, further comprising a first common electrode arranged on an inner surface of the second substrate and a second common electrode arranged on an inner surface of the third substrate, wherein each first pixel electrode, a corresponding portion of the first common electrode, and a corresponding portion of the first liquid crystal layer therebetween cooperatively define a first pixel region, each second pixel electrode, a corresponding portion of the second common electrode, and a corresponding portion of the second liquid crystal layer therebetween cooperatively define a second pixel region, and the first and second pixel regions are symmetrically arranged at two opposite sides of the first substrate.

* * * * *

UNITED STATES PATENT AND TRADEMARK OFFICE
CERTIFICATE OF CORRECTION

| | | |
|---|---|---|
| PATENT NO. | : 7,868,973 B2 | Page 1 of 1 |
| APPLICATION NO. | : 11/998020 | |
| DATED | : January 11, 2011 | |
| INVENTOR(S) | : Yuan Li and Kai Meng | |

It is certified that error appears in the above-identified patent and that said Letters Patent is hereby corrected as shown below:

On Title page please replace Item (54) and also Col. 1 Line 1-3 regarding "TITLE" on the front page of the Patent with the following:

LIQUID CRYSTAL DISPLAY DEVICE WITH TWO LIQUID CRYSTAL LAYERS

Signed and Sealed this
Fourteenth Day of June, 2011

David J. Kappos
*Director of the United States Patent and Trademark Office*